United States Patent [19]

Wiebelhaus et al.

[11] Patent Number: 5,297,660
[45] Date of Patent: Mar. 29, 1994

[54] BRAKE RING/HUG CONNECTION VIA CLAMPING NOTCHES

[75] Inventors: Wolfgang Wiebelhaus, Mülheim-Ruhr; Jürgen Schneider, Bochum; Manfred Gronemann; Hans Rocholl, both of Remscheid, all of Fed. Rep. of Germany

[73] Assignee: Bergische Stahl-Industrie, Remscheid, Fed. Rep. of Germany

[21] Appl. No.: 90,987

[22] Filed: Jul. 12, 1993

Related U.S. Application Data

[63] Continuation of Ser. No. 846,728, Mar. 4, 1992, abandoned, which is a continuation of Ser. No. 518,913, May 4, 1990, abandoned.

[30] Foreign Application Priority Data

May 11, 1989 [DE] Fed. Rep. of Germany ....... 3915415

[51] Int. Cl.⁵ ............................................. F16D 65/12
[52] U.S. Cl. .................... 188/218 XL; 188/18 A; 188/264 A
[58] Field of Search .......... 188/218 R, 218 XL, 18 A, 188/264 R, 264 A, 264 AA; 192/107 R, 107 C

[56] References Cited

U.S. PATENT DOCUMENTS

| 3,542,166 | 11/1970 | Harrison | 188/218 XL |
|---|---|---|---|
| 3,724,613 | 4/1973 | Bermingham | 188/218 XL |
| 4,083,435 | 4/1978 | Gallus et al. | 188/264 A |

FOREIGN PATENT DOCUMENTS

| 1222962 | 8/1966 | Fed. Rep. of Germany . | |
|---|---|---|---|
| 72026 | 4/1970 | Fed. Rep. of Germany | 188/218 XL |
| 2201885 | 8/1972 | Fed. Rep. of Germany | 188/218 XL |
| 2742468 | 3/1979 | Fed. Rep. of Germany . | |
| 1134959 | 4/1957 | France | 188/218 XL |
| 48622 | 3/1986 | Japan | 188/218 XL |
| 1069555 | 5/1967 | United Kingdom | 188/218 XL |
| 2093949 | 9/1982 | United Kingdom | 188/218 XL |

*Primary Examiner*—Andres Kashnikow
*Assistant Examiner*—Lee W. Young
*Attorney, Agent, or Firm*—Robert W. Becker & Associates

[57] ABSTRACT

A brake ring/hub connection via clamping notches for rail vehicles is provided. When a clamping strip is pressed into a clamping notch, the smallest cross-sectional configuration of the hub at the clamping notch is greater than the cross-sectional configuration of the clamping arms in that region thereof that is exposed to the greatest stress, and the cross-sectional configuration of the hub beyond the clamping arms is at least somewhat smaller than the cross-sectional configuration of the hub in the vicinity of the base of the clamping notch.

6 Claims, 4 Drawing Sheets

BRAKE RING/HUG CONNECTION VIA CLAMPING NOTCHES

This application is a continuation of application Ser. No. 07/846,728 filed Mar. 4, 1992 now abandoned, which is a continuation of application Ser. No. 07/518,913 filed May 4, 1990 now abandoned.

BACKGROUND OF THE INVENTION

The present invention relates to a brake ring/hub connection via clamping notches for rail vehicles, with the hub having at least three clamping notches that extend radially between clamping arms, with the clamping or connecting strips that are disposed on the brake ring being pressed into the clamping notches and the hub being pressed onto an axle.

A connection of the brake ring and hub or shaft of this type was first proposed in German Patent 1 222 962 and was accepted worldwide, since it had a number of important advantages. A primary advantage of this connection was that despite the strong clamping of the connecting strips in the clamping notch, a radial expansion of the brake ring resulting from heating-up of the brake is possible because the connecting strip can migrate in the clamping notch without dangerous stresses occurring that would result in a loosening of the clamping connection.

However, since the stresses in the railroad traffic became increasingly greater, because the rail vehicles had to drive on poor tracks and/or were driven at higher speeds, the clamping force on the one hand and the strength of the clamping arms on the other hand were made so great (see the massive construction shown in FIGS. 1-3) that neither a lifting of the connecting strips on the back side (as seen in the direction of rotation), nor a plastic bending or turning up of the clamping arm of the notch that is in contact with the connecting strip resulted. This therefore led to German Patent 27 42 468, according to which, via a specific shape (see the overall view of FIG. 1) of the clamping notch and hardening of the inner surface of the notch, a rapid wearing of the clamping surfaces is prevented, and when the connecting strips are pressed into the clamping notch, in the region of the semicylindrical bottom surface of the clamping notch stresses having a uniform nature are formed, resulting in a greater clamping force at the clamping surfaces. The hardened volume of material, which results from the semicylindrical base surface of the clamping notch and the depth of the hardened layer and is provided with residual compressive stresses, serves to absorb the brake operation stress, whereby relative to this stress a greater strength of the clamping connection results than with the aforementioned construction pursuant to German Patent 1 222 962.

In the meantime, the stresses and demands on brakes and the travel mechanism have again increased considerably. As a result, the clamping connections between the brake ring and hub are increasingly stressed more greatly. In this connection, the clamping force on the one hand and the strength of the arms of the clamping connection on the other hand must be great enough relative to the forces that are applied that neither a lifting of the guide or connecting strips on the back side, nor a plastic bending of the notch arm that is in contact with the strip, occurs. The loads caused by the aforementioned stresses involve equivalent forces that, for example, result from the vertical accelerations that act upon the clamping connections. If the strength of the clamping connections is less than these forces, the clamping force is lost and the brake rings are loosened from the hub in the direction of rotation. Even if this does not result in a loss of the safety of the vehicle during braking because the brake disk is still functional, nonetheless this condition must be avoided so that further use of these brakes does not cause undue damage to the brake system. Unfortunately, the dimensions and relationships between the various parts of the hub of the aforementioned German patent 27 42 468 were not able to meet the latest stresses and demands.

It is therefore an object of the present invention to avoid the drawbacks of the heretofore used brake disks, and to provide a connection between the brake ring and hub that can also withstand the increased requirements of modern traffic and above all can also avoid the relatively high stresses from vertical accelerations.

BRIEF DESCRIPTION OF THE DRAWING

This object, and other objects and advantages of the present invention, will appear more clearly from the following specification in conjunction with the accompanying schematic drawings, in which.

SUMMARY OF THE INVENTION

The brake ring/hub connection of the present invention is characterized primarily in that in a state when a connecting strip of the brake ring is pressed in to thereby provide a clamping connection between the connecting strip and the clamping arms of the pertaining clamping notch, the smallest cross-sectional configuration of the hub in the vicinity of a base of the clamping notch is greater than the cross-sectional configuration of the clamping arms in that region thereof that is exposed to the greatest stress, and the cross-sectional configuration of the hub beyond the clamping arms and the clamping notches is at least at certain locations smaller than one smallest cross-sectional configuration in the vicinity of the base of the clamping notch.

Thus, the various components of the hub are inventively provided with different cross-sectional configurations, which are so critical to the success of the present invention. It should be noted that in the context of the instant application, the referenced cross-sectional configurations, which could also be designated thicknesses or widths, are all taken in planes that extend parallel to the axis or central bore of the hub.

The base of the clamping notch is advantageously formed by the surface of a semicylinder, or from partially linear and tangential portions, and/or portions that are concentrically parallel to the bore of the hub.

The primary advantage of the inventive configuration of the clamping notch is that even when the brake disk is subjected to very great stress, the connection of the connecting strip with the clamping notch is maintained without having the brake ring loosened from the hub. In addition, the clamping arms can be considerably shorter and the cross-sectional configuration of the hub can be considerably less, so that a greater frictional surface results on the brake ring because the brake ring can be wider. Nonetheless, the durability and stability of the brake ring/hub connection is considerably improved relative to the heretofore conventional configuration of the clamping connection.

Further specific features of the present invention will be described in detail subsequently.

DESCRIPTION OF PREFERRED EMBODIMENTS

Figure 2:
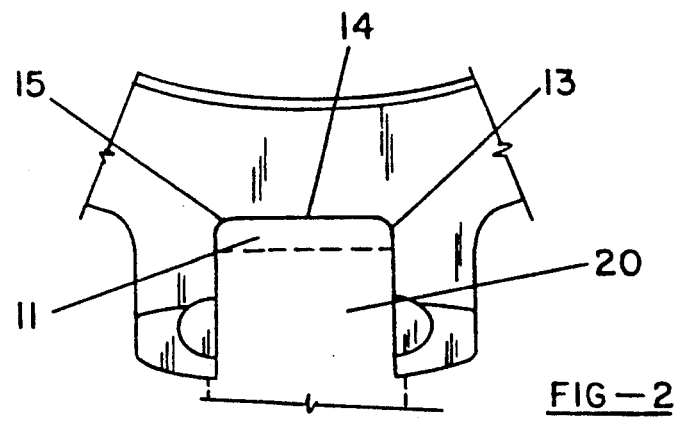
FIGS. 2-5 show various exemplary embodiments for configurations of the clamping notch base.
Figure 3:
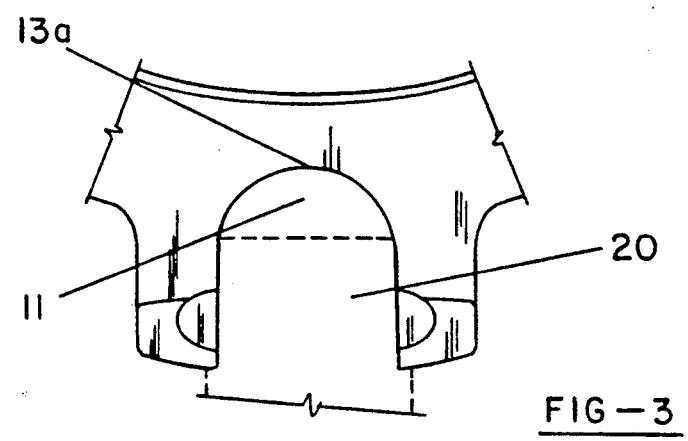

Referring now to the drawing in detail, illustrated is an inventive clamping notch 11, which is formed by the clamping arms 12 of the hub 18. In the embodiment illustrated in FIG. 2, the base 13 of the notch 11 is formed by a linear and tangentially disposed region 14; this region 14 merges into the clamping surfaces 16 of the clamping arms 12 via symmetrically disposed arcs or curved portions 15. Beyond the clamping arms 12, the cross-sectional configuration 17 of the hub 18 is at least at certain locations smaller than the cross-sectional configuration 19 at the notch base 13. When the clamping or connecting strip 20 of the brake ring 22 is pressed in, this cross-sectional configuration 19 of the hub at the notch base 13, which is the smallest cross-sectional configuration, is greater than the cross-sectional configuration 21 of the clamping arms 12 in that region thereof that is exposed to the greatest stress. See in particular FIG. 1A. These varying cross-sectional configurations are extremely critical to ensure that stresses due to deformation during pressing-in and during operation are absorbed at the proper locations in order to avoid failure of the system. It can be expedient to embody the notch base in the form of a semicylindrical surface (FIG. 3), and to uniformly harden the inner surfaces of the clamping notch 11 and to subsequently temper or anneal them at a temperature of approximately 200° C. The depth of the hardened layer should preferably be at least 1 m, but not more than 5 mm.

Figure 1:
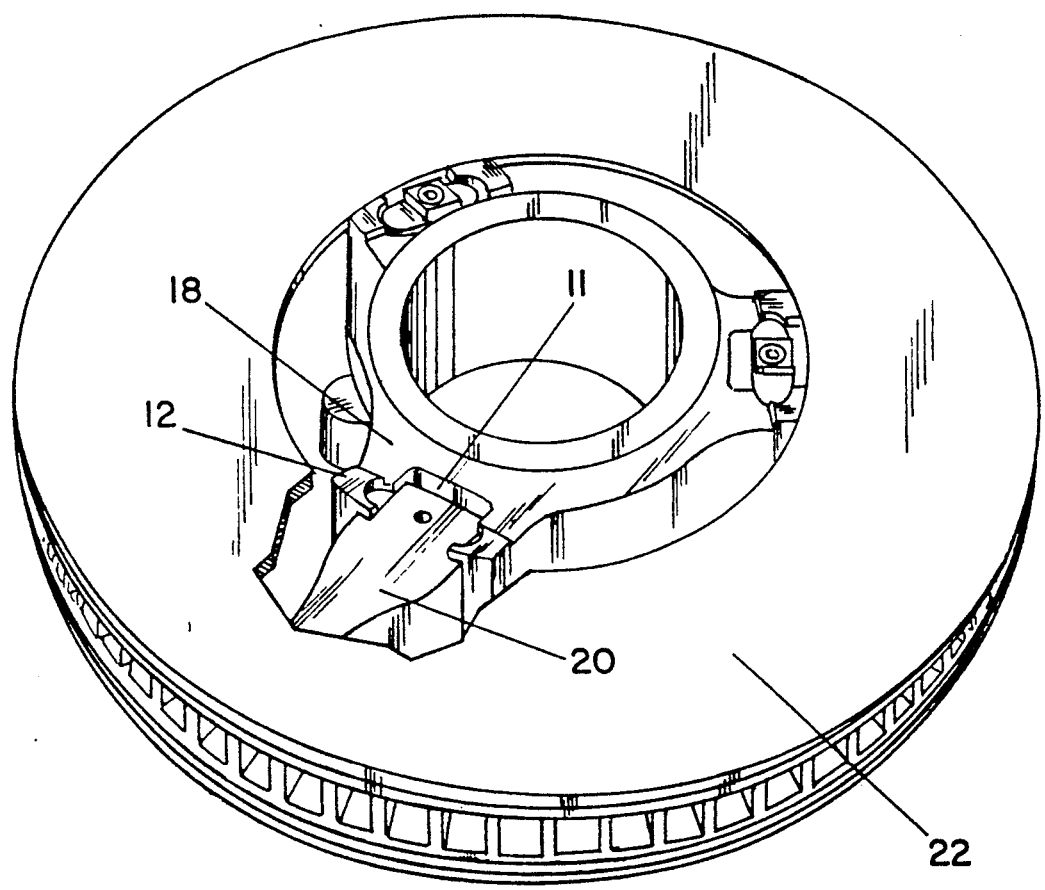
FIG. 1 is a plan view showing one exemplary embodiment of the inventive brake ring/hub connection, with the being omitted in the broken-away region.

When the inventive hub is used to secure a brake disk or a brake pressure plate on an axle, the hub 18 is first pressed onto the axle, which is embodied as a hollow tube. In this connection, the oversize of the axle is such that no plastic deformation occurs at any cross-section of the hub 18. However, in order to reliably prevent a deformation in the notch 11, the cross-sectional configuration 17 of the hub 18 must at individual locations be at least somewhat smaller than the cross-sectional configuration 19 that exists at the base 13 of the notch. After the hub 18 has been placed upon the axle, the brake ring 22, with the connecting strips 20 disposed thereon (there are generally three such strips, as illustrated in FIG. 1), can be connected with the hub 18 by pressing the connecting strips 20 into the clamping notches 11. In so doing, the oversize of the connecting strips should be such that that portion of the hub 18 disposed at the notch base 13 is not permanently deformed. This is achieved by the fact that when the connecting strip 20 is pressed in, the smallest cross-sectional configuration 19 in the clamping notch 11 is greater than the cross-sectional configuration 21 of the clamping arms 12 in that region thereof that is exposed to the greatest stress. This region is located approximately where the linear clamping surfaces 16 end. An improvement can be achieved by hardening the inner surfaces in the clamping notch 11 to approximately 52 HRc, and via tempering at 200° C. and not deeper than 5 mm, because in the hardened surfaces inherent or residual stresses exist against which the operating stresses act.

Figure 4:
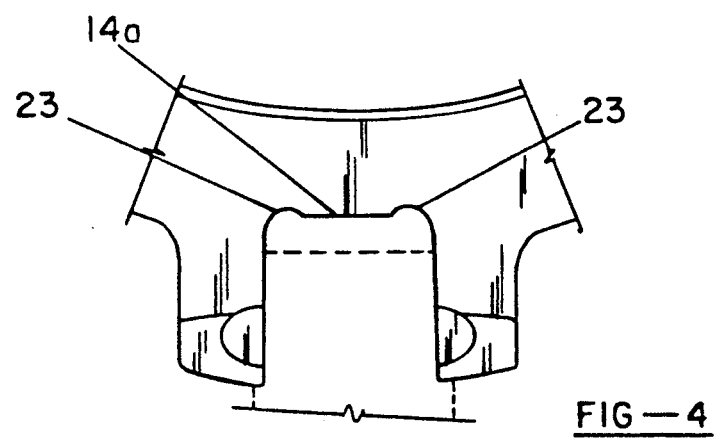
Figure 5:
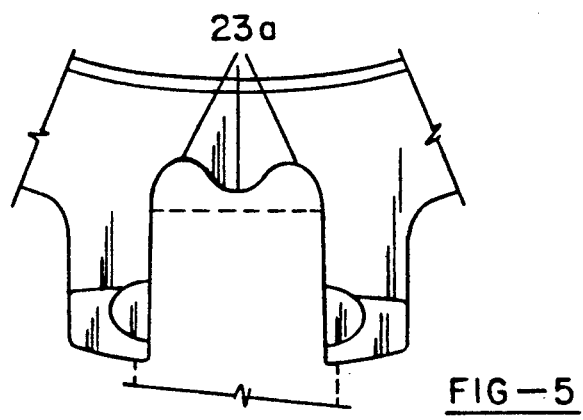

In place of the linear portion 14 in the notch base 13, it is also readily possible to provide a base that partially comprises a linear portion 14a and partially comprises portions 23 that are concentric to the bore of the hub (FIG. 4). The base can also readily comprise several regions 23a that are concentric to the bore of the hub (FIG. 5).

The clamping arms 12 can furthermore have other suitable shapes, as long as attention is paid to the fact that the smallest cross-sectional configuration 19 in the clamping notch 11, when the connecting strip 20 is pressed in, is greater than the cross-sectional configuration 21 of the clamping arms 12 in that region thereof that is exposed to the greatest stress.

Figure 1A:
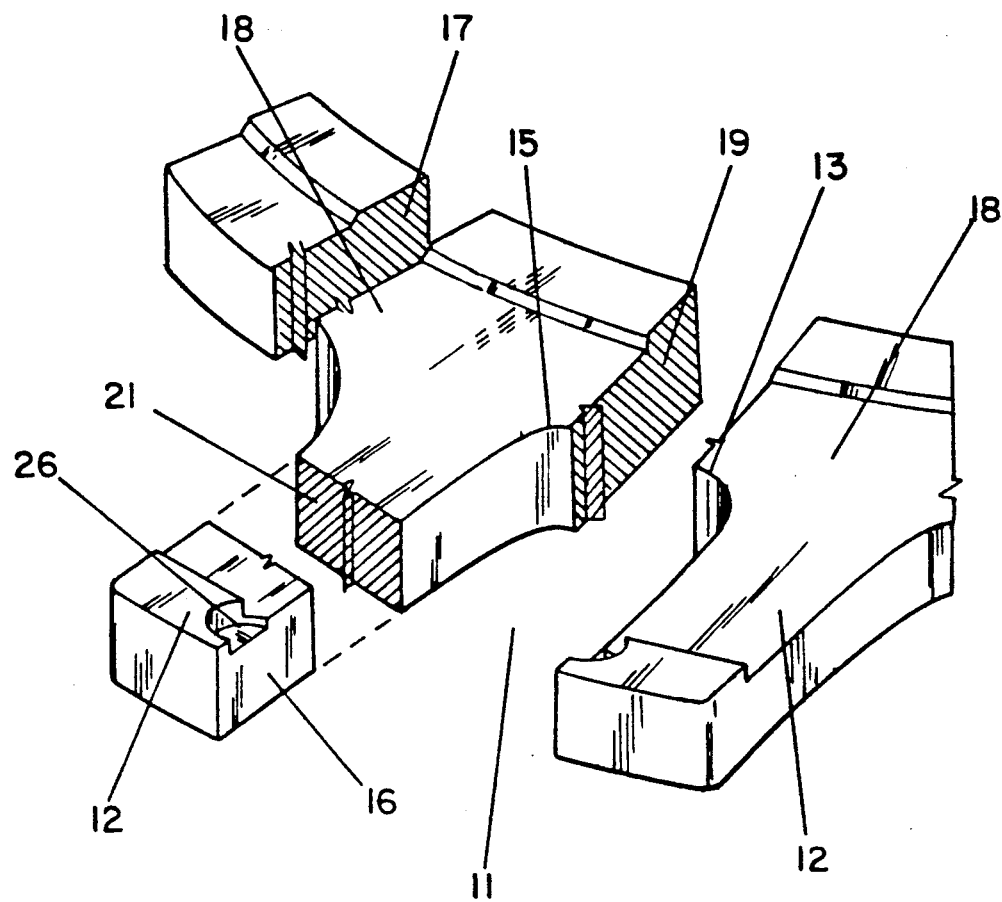
FIG. 1A is a partial view of the hub in the vicinity of one of its clamping notches, and also shows the critical cross-sectional configuration of the hub.
Figure 6:
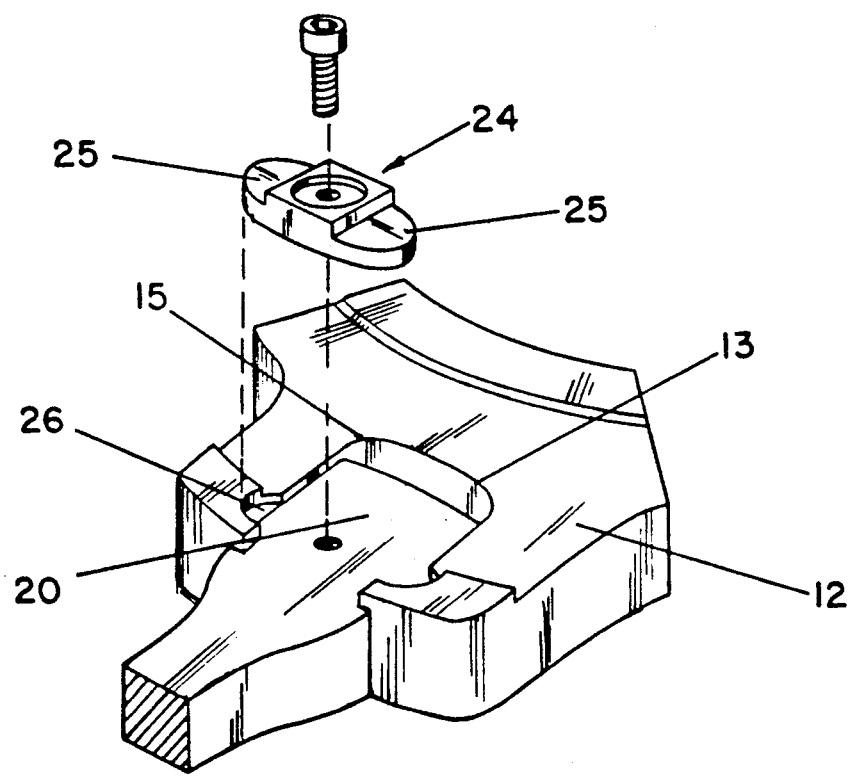
FIG. 6 illustrates a retaining element for preventing axial displacement of the connecting strip in the clamping notch.

As further shown in FIG. 6, in order to prevent axial shifting or displacement of the connecting strips 20 in their clamping notches 11, elements 24 can be provided on both sides of the connecting strips 20, with the ends 25 of the elements 24 resting on the bases of notches 26 that are provided in the clamping arms 12 (See also FIG. 1A).

The present invention is, of course, in no way restricted to the specific disclosure of the specification and drawing, but also encompasses any modifications within the scope of the appended claims.

What we claim is:

1. In a brake ring/hub connection via clamping notches for a rail vehicle, with a hub having at least three clamping notches that extend radially between clamping arms, and with connecting strips that are disposed on a brake ring being pressed into said clamping notches and said hub being pressed onto an axle, the improvement wherein:

in a state when a connecting strip of said brake ring is pressed in to thereby provide a clamping connection between said connecting strip and said clamping arms of the pertaining clamping notch, the smallest cross-sectional configuration of said hub in a base of said clamping notch is greater than the cross-sectional configuration of said clamping arms in that region thereof that is exposed to the greatest stress, and the cross-sectional configuration of said hub beyond said clamping arms and said clamping notches is at least at certain locations smaller than said smallest cross-sectional configuration in said base of said clamping notch.

2. A brake ring/hub connection according to claim 1, in which said base of said clamping notch is formed by the surface of a semi-cylinder.

3. A brake ring/hub connection according to claim 1, in which said base of said clamping notch is formed by a region that is partially linear as well as being tangential relative to said axle.

4. A brake ring/hub connection according to claim 1, in which said base of said clamping notch is formed by regions that are concentric central to a bore of said hub.

5. A brake ring/hub connection according to claim 1, in which said base of said clamping notch is formed by a region that is partially linear and regions that are concentric to a central bore of said hub.

6. A brake ring/hub connection according to claim 1, in which the entire inner surface of said clamping notch is uniformly surface hardened and subsequently tempered at a temperature of about 200° C. to a hardness of about 52 HRc to produce a hardened layer of at least 1 mm and no more than 5 mm.

* * * * *